United States Patent
Lv

(10) Patent No.: US 9,763,263 B2
(45) Date of Patent: Sep. 12, 2017

(54) SCHEDULING METHOD AND BASE STATION

(71) Applicant: Huawei Technologies Co., Ltd., Shenzhen (CN)

(72) Inventor: Xinyan Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 14/962,005

(22) Filed: Dec. 8, 2015

(65) Prior Publication Data

US 2016/0095135 A1 Mar. 31, 2016

Related U.S. Application Data

(63) Continuation of application No. PCT/CN2013/077109, filed on Jun. 9, 2013.

(51) Int. Cl.
*H04W 72/12* (2009.01)
*H04L 5/00* (2006.01)

(52) U.S. Cl.
CPC ....... *H04W 72/1268* (2013.01); *H04L 5/0078* (2013.01); *H04W 72/12* (2013.01); *H04W 72/1205* (2013.01); *H04W 72/1289* (2013.01); *H04L 5/001* (2013.01)

(58) Field of Classification Search
None
See application file for complete search history.

(56) References Cited

U.S. PATENT DOCUMENTS

| | | |
|---|---|---|
| 2012/0198077 A1 | 8/2012 | Wei |
| 2014/0179331 A1 | 6/2014 | Futaki |
| 2016/0073401 A1 | 3/2016 | Skov et al. |

FOREIGN PATENT DOCUMENTS

| | | |
|---|---|---|
| CN | 101707808 A | 5/2010 |
| CN | 101835191 A | 9/2010 |
| CN | 102238748 A | 11/2011 |
| CN | 102548007 A | 7/2012 |
| CN | 102685897 A | 9/2012 |
| EP | 2498435 A2 | 9/2012 |
| EP | 2472978 A1 | 7/2013 |

(Continued)

OTHER PUBLICATIONS

"Handling Timing Advance Differences," Agenda Item: 7.1 .2.4, Source: InterDigital Communications, Document for: Discussion and Decision, 3GPP TSG RAN WG2 #77, R2-120623, Feb. 6-10, 2012, Dresden, Germany, 10 pages.

*Primary Examiner* — Eunsook Choi
(74) *Attorney, Agent, or Firm* — Slater Matsil, LLP

(57) ABSTRACT

A scheduling method includes: enabling, by a base station, first scheduling to allocate resources to first-category UE, where the base station is configured to process data on a second component carrier of the first-category UE, and a current cell of the first-category UE is a secondary cell corresponding to the secondary component carrier; and transmitting, by the base station, data of the first-category UE over an air interface according to the allocated resources, where an enabling moment of the first scheduling is a first duration ahead of an air interface transmission moment corresponding to the first scheduling, the first duration is greater than a second duration, and the second duration is a duration ahead of an air interface transmission moment corresponding to the second scheduling compared with an enabling moment of the second scheduling. A real-time requirement in a CA scenario can be met by using the method.

13 Claims, 8 Drawing Sheets

(56) References Cited

FOREIGN PATENT DOCUMENTS

| | | |
|---|---|---|
| JP | 2012019314 A | 1/2012 |
| JP | 2012070134 A | 4/2012 |
| JP | 2013509120 A | 3/2013 |
| KR | 20120101370 A | 9/2012 |
| KR | 20120103400 A | 9/2012 |
| KR | 20130016327 A | 2/2013 |
| WO | 2011023217 A1 | 3/2011 |
| WO | 2012124958 A2 | 9/2012 |
| WO | 2013011288 A1 | 1/2013 |
| WO | 2013018290 A1 | 2/2013 |

SCHEDULING METHOD AND BASE STATION

This application is a continuation of International Application No. PCT/CN2013/077109, filed on Jun. 9, 2013, which is hereby incorporated by reference in its entirety.

TECHNICAL FIELD

The present invention relates to the field of communications technologies, and in particular, to a scheduling method and a base station.

BACKGROUND

With development of mobile communications technologies and broadband wireless access technologies, services of the two interpenetrate. A technology, such as carrier aggregation (CA), is introduced into a mobile communications system, so as to meet a requirement of broadbandization of mobile communications and cope with a challenge from mobility of broadband communications.

With aggregation of multiple consecutive or non-consecutive component carriers in the CA technology, larger bandwidth can be acquired, so that a peak data rate and a system throughput are increased, and at the same time, an operator's problem of frequency spectrum discontinuity is also solved. User equipment (UE) is capable of separately supporting aggregation of multiple component carriers (CC) in downlink and uplink. The multiple aggregated component carriers include one primary component carrier (PCC) and at least one secondary component carrier (SCC). A carrier initially accessed by the UE is a PCC, and one or more other carriers are SCCs.

Layer 2 (L2) defined in the 3rd Generation Partnership Project (3GPP) protocol includes a Packet Data Convergence Protocol (PDCP) layer, a Radio Link Control (RLC) layer, and a Medium Access Control (MAC) layer. After the CA technology is introduced, the SCC is visible only at the MAC layer, and the PCC and the SCC are not differentiated at the PDCP layer and the RLC layer. As a result, when data is processed at layer 2, a wait delay is introduced before the data is processed at the RLC layer, which makes it difficult to meet a real-time requirement.

SUMMARY

Embodiments of the present invention provide a scheduling method and a base station to solve a problem that it is difficult to meet a real-time requirement.

A first aspect of the embodiments of the present invention provides a scheduling method, including:

enabling, by a base station, first scheduling to allocate resources to first-category user equipment (UE), where the base station is configured to process data on a secondary component carrier of the first-category UE, and a current cell of the first-category UE is a secondary cell corresponding to the secondary component carrier; and transmitting, by the base station, data of the first-category UE over an air interface according to the resources allocated to the first-category UE, where:

an enabling moment of the first scheduling is a first duration ahead of an air interface transmission moment corresponding to the first scheduling; the first duration is greater than a second duration; the second duration is a duration ahead of an air interface transmission moment corresponding to second scheduling compared with an enabling moment of the second scheduling; and the second scheduling is scheduling for the first-category UE when the first scheduling is not enabled, or the second scheduling is scheduling for second-category UE, where the second-category UE is any one or more types of the following UEs among UEs served by the base station: UE that does not support carrier aggregation (CA), UE supporting CA and whose current cell is a primary serving cell, and UE supporting CA and whose secondary component carrier is not activated.

In a first possible implementation manner of the first aspect, the first duration is at least 1 ms greater than the second duration.

With reference to the first aspect or the first possible implementation manner of the first aspect, in a second possible implementation manner of the first aspect, before the base station enables the first scheduling, the method further includes:

determining whether a scheduling condition is met; and the enabling, by the base station, the first scheduling includes:

enabling the first scheduling when the scheduling condition is met.

With reference to the second possible implementation manner of the first aspect, in a third possible implementation manner of the first aspect, the scheduling condition includes any one or more of the following:

a round trip delay between a board on which a secondary component carrier of the UE is located and a board on which a primary component carrier of the UE is located is greater than or equal to a preset value;

a timeout of air interface data of a base station or the board on which the secondary component carrier of the UE is located reaches or exceeds a preset threshold;

a load of the base station or the board on which the secondary component carrier of the UE is located is greater than or equal to a first preset load; and a load of a base station or the board on which the primary component carrier of the UE is located is greater than or equal to a second preset load.

With reference to the second or third possible implementation manner of the first aspect, in a fourth possible implementation manner of the first aspect, after the base station enables first scheduling, the method further includes:

enabling, by the base station, the second scheduling to allocate resources to the second-category UE, where the second scheduling is scheduling for the second-category UE; and transmitting, by the base station when transmitting the data of the first-category UE, data of the second-category UE over the air interface according to the resources allocated to the second-category UE.

A second aspect of the embodiments of the present invention provides a base station, configured to process data on a secondary component carrier of first-category UE, and a current cell of the first-category UE is a secondary cell corresponding to the secondary component carrier, where the base station includes:

a scheduling unit, configured to enable first scheduling to allocate resources to the first-category user equipment (UE); and a transmission unit, configured to transmit data of the first-category UE over an air interface according to the resources allocated to the first-category UE, where:

an enabling moment of the first scheduling is a first duration ahead of an air interface transmission moment corresponding to the first scheduling; the first duration is greater than a second duration; the second duration is a duration ahead of an air interface transmission moment corresponding to second scheduling compared with an enabling moment of the second scheduling; and the second scheduling is scheduling for the first-category UE when the first scheduling is not enabled, or the second scheduling is scheduling for second-category UE, where the second-category UE is any one or more types of the following UEs among UEs served by the base station: UE that does not support carrier aggregation (CA), UE supporting CA and whose current cell is a primary serving cell, and UE supporting CA and whose secondary component carrier is not activated.

In a first possible implementation manner of the second aspect, the first duration is at least one frame, one transmission time interval TTI, or 1 ms greater than the second duration.

With reference to the second aspect or with reference to the first possible implementation manner of the second aspect, in a second possible implementation manner of the second aspect, the base station further includes:

a determining unit, configured to determine whether a scheduling condition is met; where the scheduling unit is configured to enable the first scheduling when the determining unit determines that the scheduling condition is met.

With reference to the second possible implementation manner of the second aspect, in a third possible implementation manner of the second aspect, the scheduling condition includes any one or more of the following:

a round trip delay between a board on which a secondary component carrier of the UE is located and a board on which a primary component carrier of the UE is located is greater than or equal to a preset value;

a timeout of air interface data of a base station or the board on which the secondary component carrier of the UE is located reaches or exceeds a preset threshold;

a load of the base station or the board on which the secondary component carrier of the UE is located is greater than or equal to a first preset load; and a load of a base station or the board on which the primary component carrier of the UE is located is greater than or equal to a second preset load.

With reference to the second or third possible implementation manner of the second aspect, in a fourth possible implementation manner of the second aspect, the following is further included:

when the determining unit determines, after the scheduling unit enables the first scheduling, that the scheduling condition is not met, the scheduling unit is triggered to cancel the first scheduling.

With reference to the second aspect or with reference to the first, second, third, or fourth possible implementation manner of the second aspect, in a fifth possible implementation manner of the second aspect, the scheduling unit is further configured to enable, after the first scheduling is enabled, the second scheduling to allocate resources to the second-category UE, where the second scheduling is the scheduling for the second-category UE; and the transmission unit is further configured to transmit, when transmitting the data of the first-category UE, data of the second-category UE over the air interface according to the resources allocated to the second-category UE.

A third aspect of the embodiments of the present invention provides a computer program product, including a computer readable medium, where the computer readable medium includes a group of program code, used to perform, for example, the method in the first aspect or in any implementation manner of the first aspect.

Implementing the embodiments of the present invention achieves the following beneficial effect:

Performing in-advance scheduling for UE is equivalent to improving a scheduling priority of the UE, so that RTT becomes longer, thereby lowering a delay requirement in a CA scenario and solving a problem that it is difficult to meet a real-time requirement in a CA technology.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
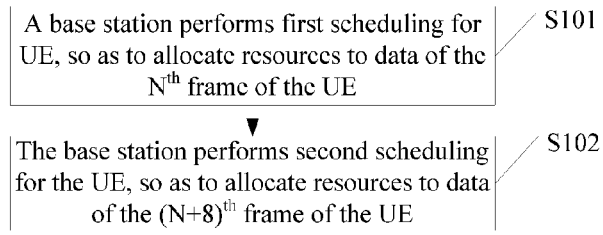
FIG. 1 is a schematic flowchart of a scheduling method according to a first embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Introduction of a CA technology poses a serious challenge to a real-time requirement (or a delay requirement), inter-board bandwidth, a hardware processing capability, and the like on a base station. This is because there are multiple CCs used to bear data of UE, including a PCC and an SCC, and the SCC is visible only for MAC in L2. Therefore, after the data of the UE is processed at PDCP, RLC processing is not immediately performed for the data of the UE, but the RLC processing is enabled by MAC scheduling results of all CCs of the UE to generate an RLC protocol data unit (PDU), and the RLC PDU is sent to a MAC layer to be distributed to all the CCs. When baseband processing locations of all the CCs are distributed in different space, especially in a relatively long distance, for example, the baseband processing locations belong to different boards (such as different boards in a same base station, boards in different subracks in a same base station, or boards in different base stations), a wait delay before the RLC processing and a PDU transmission delay are relatively long, and therefore, it is difficult to meet a current real-time requirement on the base station, and it even cannot be ensured that the RLC PDU or a MAC PDU is timely sent to a baseband for processing, thereby leading to an air interface sending failure. For example, in a frequency division duplex (FDD) system, eight hybrid automatic repeat request (HARQ) processes exist; and if a downlink peak is required to be reached, a process starting from MAC scheduling, to downlink data sending over an air interface, and to the time when an HARQ feedback corresponding to the data arrives for the MAC scheduling takes eight transmission time intervals (TTI) at most, otherwise the HARQ process cannot be released in next round of scheduling, where a time requirement in this process is called a round trip time (RTT) delay requirement. Because the wait delay before the RLC processing and the PDU transmission delay are relatively long, it is a great challenge to complete a packet assembly and distribution process of the data in the RTT delay requirement (eight TTIs). Similarly, in a time division duplex (TDD) system, although an RTT delay requirement is longer than eight TTIs, a same problem exists.

In consideration of the foregoing problem, in-advance scheduling is performed for UE in the present application, which is equivalent to improving a scheduling priority of the UE and increasing an RTT delay requirement, so that a delay requirement is lowered. For example, if the UE is scheduled one frame in advance, the RTT delay requirement decreases from 8 TTIs to 9 TTIs because a scheduling period is one TTI, so that it is easier to meet the RTT delay requirement.

Refer to FIG. 1, which is a schematic flowchart of a scheduling method according to a first embodiment of the present invention. The method is executed by a base station and specifically may be executed by a board in the base station. In addition, the base station or the board is configured to process data on an SCC of UE supporting CA, and a current cell of the UE is under the base station, that is, the current cell of the UE is a secondary serving cell (SCell) corresponding to the SCC, which is briefly referred to as a secondary cell below. As shown in FIG. 1, the method includes the following steps:

S101: A base station performs first scheduling for UE so as to allocate resources for data in the $N^{th}$ frame of the UE, where the base station is configured to process data on an SCC of the UE, a current cell of the UE is a secondary cell corresponding to the SCC, and N is an integer greater than or equal to zero.

S102: The base station performs second scheduling for the UE so as to allocate resources for data in the $(N+8)^{th}$ frame of the UE, where a duration between the second scheduling and the first scheduling is greater than eight TTIs.

Figure 2:
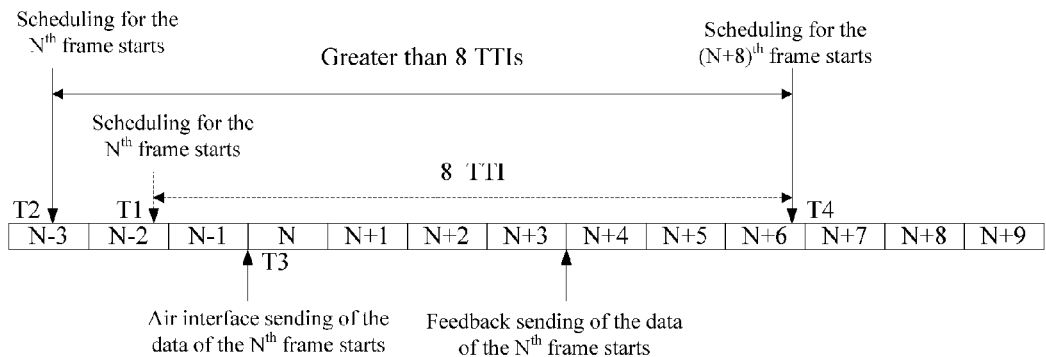
FIG. 2 is a scheduling sequence diagram in the first embodiment of the present invention.

Continue to refer to FIG. 2, which is a scheduling sequence diagram according to the first embodiment of the present invention. As shown in FIG. 2, a dashed line location T1 in the figure is a scheduling moment for the $N^{th}$ frame in the prior art, and a solid line location T2 is a scheduling moment for the $N^{th}$ frame in the first embodiment, which is a period of time ahead of the T1 moment. In this way, when the data in the $N^{th}$ frame is sent over an air interface at a T3 moment, the UE starts to send an HARQ feedback four TTIs later, and the HARQ feedback to the data in the $N^{th}$ frame is returned to the base station and sent to L2 for MAC scheduling, a next period of MAC scheduling, that is, scheduling for the $(N+8)^{th}$ frame, starts at a T4 moment. It can be seen that, compared with the prior art, a duration from the T3 moment to the T4 moment is unchanged, a duration from a start moment of the scheduling to the moment T3 of data sending over the air interface is increased in the foregoing technical solution, thereby increasing an overall RTT delay, so that it is easier to meet a real-time requirement.

It should be noted that a PCC and an SCC are described from an angle of UE side; and each CC is a PCC for certain terminals, but may be an SCC for other terminals. Particular UE is not used as an example in the present application, but a processing manner of scheduling for UE whose current cell is a secondary cell is described, where the processing manner is capable of lowering a current delay requirement. However, the UE is not limited thereto. The UE may also be UE that does not support CA (such as UEs of R8 and R9 versions), UE whose current cell is a PCC, or UE whose SCC is not activated. In addition, the PCC and the SCC are described from the angle of the UE side. For ease of description, this specification borrows this concept, a board processing data borne on a PCC of UE is called a board on which an PCC is located (or a board on which an PCC is deployed), and a board processing data borne on an SCC of the UE is called a board on which an SCC is located (or a board on which an SCC is deployed). In addition, the board on which an SCC is located and the board on which a PCC is located may be the same or different. In addition, when they are different, the board on which an SCC is located performs in-advance scheduling for the UE and sends a scheduling result to the board on which a PCC is located so as to instruct the board on which a PCC is located to perform RLC PDU framing, and the board on which a PCC is located transmits a framed PDU to the board on which an SCC is located, so that the board on which an SCC is located sends data of the UE by using resources allocated during the scheduling. Because there is a certain distance between the board on which an SCC is located and the board on which a PCC is located, and a wait delay before RLC processing and a PDU transmission delay are relatively long, it is difficult to meet an RTT delay requirement. Through the foregoing technical solution, the RTT delay requirement increases, so that it is easier to meet the RTT delay requirement. In addition, in a situation in which the total amount of data (such as Q) keeps unchanged, a requirement on inter-board bandwidth (represented by a ratio of Q to RTT) is lowered because of an increase in the RTT delay requirement, so that it is also easier to meet the requirement on the inter-board bandwidth.

In addition, the board on which an SCC is located and the board on which a PCC is located may be located in a same subrack or base station, or located in different subracks or base stations; and in an inter-subrack scenario, a cross-site scenario, and the like, because there is a relatively long distance between them, the scheduling method in this embodiment has a better remission effect on a real-time requirement.

A policy on differentiating between UEs is used as an example in the following to describe still another implementation manner of the foregoing solution.

Figure 3:
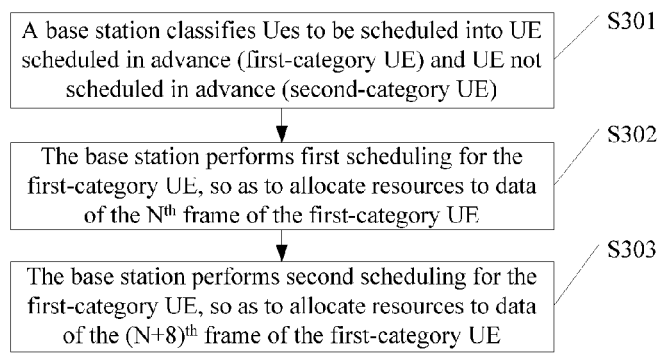
FIG. 3 is a schematic flowchart of a scheduling method according to a second embodiment of the present invention.

Refer to FIG. 3, which is a schematic flowchart of a scheduling method according to a second embodiment of the present invention. As shown in FIG. 3, before step S101 in the method shown in FIG. 1, the following step is further included:

S301: A base station classifies UEs to be scheduled into UE scheduled in advance (first-category UE) and UE not scheduled in advance (second-category UE).

For example, the UE not scheduled in advance includes UE that does not support CA (such as UE of R8 or R9), UE supporting CA and whose SCC is not configured or activated, UE whose current cell is a primary cell corresponding to a PCC and for which in-advance scheduling is not performed no matter its SCC is activated or not; and the UE scheduled in advance includes UE whose current cell is an SCell corresponding to an SCC, where, because its current cell is the SCell, it indicates that its SCC is activated, and therefore it may also be called UE whose SCC is activated and whose current cell is the SCell.

Then, steps S101 to S102 shown in FIG. 1 are performed for the UE scheduled in advance, that is, the first-category UE.

In addition, an in-advance scheduling determination function may be deployed in the base station. That is, when the problem about a delay requirement, inter-board bandwidth, a hardware processing capability, or the like does not occur, in-advance scheduling may not be enabled; but when the problem occurs, the in-advance scheduling is enabled. In this way, an RTT delay requirement is increased when a scenario is identified, and the in-advance scheduling is not performed in any scenario, so that frequency utilization of an entire network is more greatly improved.

In this case, it is necessary to construct a determining condition for the in-advance scheduling (scheduling condition for short in the following). A round trip delay is a time interval from the time a board on which an SCC is located sends a packet to the time the board on which an SCC is located receives a response to the sent packet, where the response is fed back by a board on which a PCC is located. For example, the round trip delay may be a time interval from the time the board on which an SCC is located sends a scheduling result to the time the board on which an SCC is located receives an RLC PDU, which is sent, according to the scheduling result, by the board on which a PCC is located, or may be a time interval from the time the board on which an SCC is located sends one piece of specially set information to the time the board on which an SCC is located receives a response returned by the board on which a PCC is located. When this time interval is relatively long, it indicates that a delay itself is fairly long, and it is no good processing data more quickly. In this case, if the in-advance scheduling is performed and the RTT delay requirement is increased, a problem of a decrease in processing efficiency will not be brought, and therefore the in-advance scheduling can be enabled.

In addition, some information reflecting a processing capability of a base station or a board itself, such as a load of a board or a base station and periodical statistics about a timeout of air interface data of a board or a base station, may also be used to construct an in-advance scheduling condition. When the information reflects that when the processing capability of the board or a base station in which the board is located is inadequate, it is no good processing data more quickly. In this case, if the in-advance scheduling is performed and the RTT delay requirement is increased, a problem of a decrease in processing efficiency will not be brought, and therefore the in-advance scheduling can be enabled.

For example, when one of the following scenarios is met, in-advance scheduling for the UE is enabled:

1) a round trip delay between the board on which an SCC is located and the board on which a PCC is located is excessively long;

2) there are excessive timeouts of air interface data of a base station or the board on which an SCC is located;

3) a load of the base station or the board on which an SCC is located is excessively heavy; and 4) a load of a base station or the board on which a PCC is located is excessively heavy.

In this case, input of the in-advance determination function may include the following information:

1) detection of the round trip delay between the board on which an SCC is located and the board on which a PCC is located;

2) periodical statistics about the timeouts of the air interface data of the base station or the board on which an SCC is located;

3) the load of the base station or the board on which an SCC is located; and 4) the load of the base station or the board on which a PCC is located.

In addition, if none of the foregoing in-advance scheduling conditions is met, the in-advance scheduling for the UE may be canceled and normal scheduling is restored, so that the frequency utilization of the entire network is further improved.

For example, when the following scenarios are met, the in-advance scheduling for the UE is canceled:

1) the round trip delay between the board on which an SCC is located and the board on which a PCC is located is in a required range;

2) the number of timeouts of the air interface data of the base station or the board on which an SCC is located is in a normal range, or a timeout ratio (such as a ratio of timeout data in a period to total data in the period) is in a normal range;

3) the load of the base station or the board on which an SCC is located is in a normal range; and 4) the load of the base station or the board on which a PCC is located is in a normal range.

It should be noted that one or more of the four conditions may be selected arbitrarily as the scheduling condition, and a corresponding in-advance scheduling cancellation condition may be consistent or inconsistent with the scheduling condition. When all the four conditions are selected, and the in-advance scheduling cancellation condition are consistent with the four conditions, the in-advance scheduling is enabled so long as one of them is met; and when none of the conditions is met, the in-advance scheduling is canceled. This represents an easy-in difficult-out policy. In addition, a person skilled in the art may select a condition according to a policy need, which is not limited in the present application.

The following describes still another implementation manner of the foregoing solution by using an example of a policy that whether an in-advance scheduling condition is met is predetermined and in-advance scheduling is enabled when the in-advance scheduling condition is met.

Figure 4:
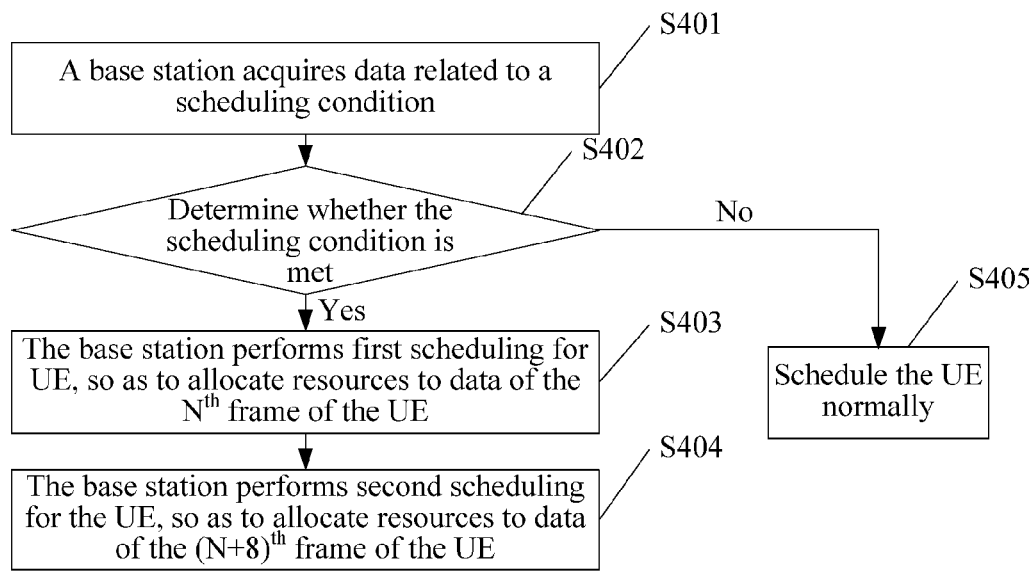
FIG. 4 is a schematic flowchart of a scheduling method according to a third embodiment of the present invention.

Refer to FIG. 4, which is a schematic flowchart of a scheduling method according to a third embodiment of the present invention. In this embodiment, the method includes the following steps:

S401: A base station acquires data related to a scheduling condition.

The related data may be a round trip delay between a board on which an SCC is located and a board on which a PCC is located, a timeout situation of air interface data of a base station or the board on which an SCC is located, a load situation of the base station or the board on which an SCC is located, or a load situation of a base station or the board on which a PCC is located, which is reported by the board on which a PCC is located.

S402: Determine whether the scheduling condition is met, where the scheduling condition includes one or more of the following:

the round trip delay between the board on which an SCC is located and the board on which a PCC is located is greater than or equal to a preset value;

a timeout of the air interface data of the base station or the board on which an SCC is located reaches or exceeds a preset threshold, where the preset threshold may be a timeout ratio threshold, a threshold of a percentage of timeout time in the total time, or the like, which is not limited in this embodiment;

a load of the base station or the board on which an SCC is located is greater than or equal to a first preset load; and a load of the base station or the board on which a PCC is located is greater than or equal to a second preset load.

When the in-advance scheduling condition meets any one of the foregoing, steps S101 to S102 shown in FIG. 1 are performed. Otherwise, step S405 is performed, and in-advance scheduling is not performed for UE, that is, normal scheduling is performed for the UE, so that a duration between scheduling for the $N^{th}$ frame of the UE and the $(N+8)^{th}$ frame of the UE is equal to eight TTIs.

Figure 5:
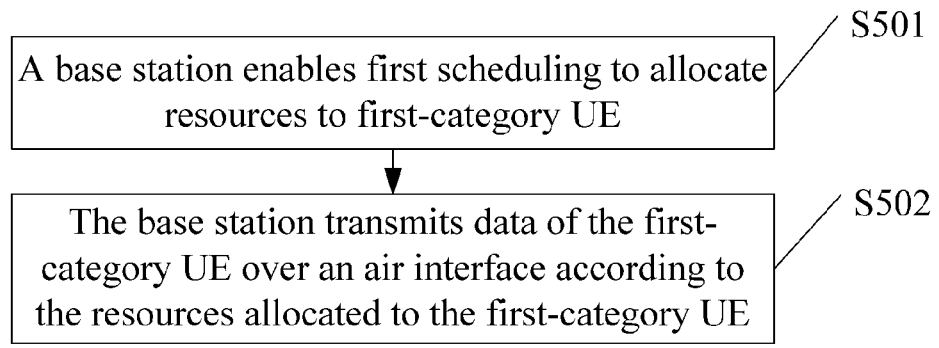
FIG. 5 is a schematic flowchart of a scheduling method according to a fourth embodiment of the present invention.

Refer to FIG. 5, which is a schematic flowchart of a scheduling method according to a fourth embodiment of the present invention. The method is executed by a base station and specifically may be executed by a board in the base station. In addition, the base station or the board is configured to process data on an SCC of certain UE supporting CA, and a current cell of the UE is located under the base station, that is, the current cell of the UE is a secondary cell corresponding to the SCC. As shown in FIG. 5, the method includes the following steps:

S501: A base station enables first scheduling to allocate resources to first-category UE, where the base station is configured to process data on an SCC of the first-category UE, and a current cell of the first-category UE is a secondary cell corresponding to the SCC.

S502: The base station performs air interface transmission, including: transmitting data of the first-category UE over an air interface according to the resources allocated to the first-category UE.

An enabling moment of the first scheduling is a first duration ahead of an air interface transmission moment; the first duration is greater than a second duration; the second duration is a duration ahead of an air interface transmission moment corresponding to second scheduling compared with an enabling moment of the second scheduling; and the second scheduling is scheduling for the first-category UE when the first scheduling is not enabled, or the second scheduling is scheduling for second-category UE, where the second-category UE is any one or more types of the following UEs among UEs served by the base station: UE that does not support CA, UE supporting CA and whose current cell is a primary serving cell (PCell, primary cell for short in the following), and UE supporting CA and whose SCC is not activated.

In this embodiment, the UEs served by the base station include the first-category UE and the second-category UE, where the first-category UE is UE supporting CA and whose current cell is a secondary cell, that is, the SCC of the UE is activated and the current cell is a secondary cell corresponding to the activated SCC. The second-category UE is UE that does not conform to the conditions, such as UE that does not support carrier aggregation (CA) (such as UE of R8, R9, or an earlier version), UE supporting CA and whose current cell is a primary cell, and UE supporting CA and whose SCC is not activated. For the first-category UE, in-advance scheduling may be performed because the first-category UE faces the foregoing technical problems; and for the second-category UE, the in-advance scheduling may not be performed because the second-category UE does not face the foregoing technical problems. Therefore, air interface resources are more effectively used. In addition, an in-advance scheduling (that is, the first scheduling) enabling condition may further be configured, so that when the condition is met, the in-advance scheduling is enabled, and the air interface resources are more effectively used. The enabling condition is described in detail subsequently.

It should be noted that air interface transmission corresponding to the first scheduling and air interface transmission corresponding to the second scheduling may be at different moments or a same moment. For example, when the second scheduling is scheduling for the first-category UE when the first scheduling is not enabled, air interface transmission moments corresponding to the first scheduling and the second scheduling are different, but when the two air interface transmission moments are aligned, the enabling moment of the first scheduling is ahead of the enabling moment of the second scheduling, which are equivalent to increasing an entire RTT delay and make it easier to meet a real-time requirement. For another example, when the second scheduling is scheduling for the second-category UE, the air interface transmission moments corresponding to the first scheduling and the second scheduling may be the same or different. For example, the air interface transmission moments are the same, that is, the data of the first-category UE and data of the second-category UE are transmitted at a same moment, but the scheduling for the two categories of UEs is enabled at different moments. Because the scheduling for the first-category UE is performed in advance, which is equivalent to increasing the entire RTT delay compared with the scheduling for the second-category UE, it is easier to meet the real-time requirement.

Figure 6:
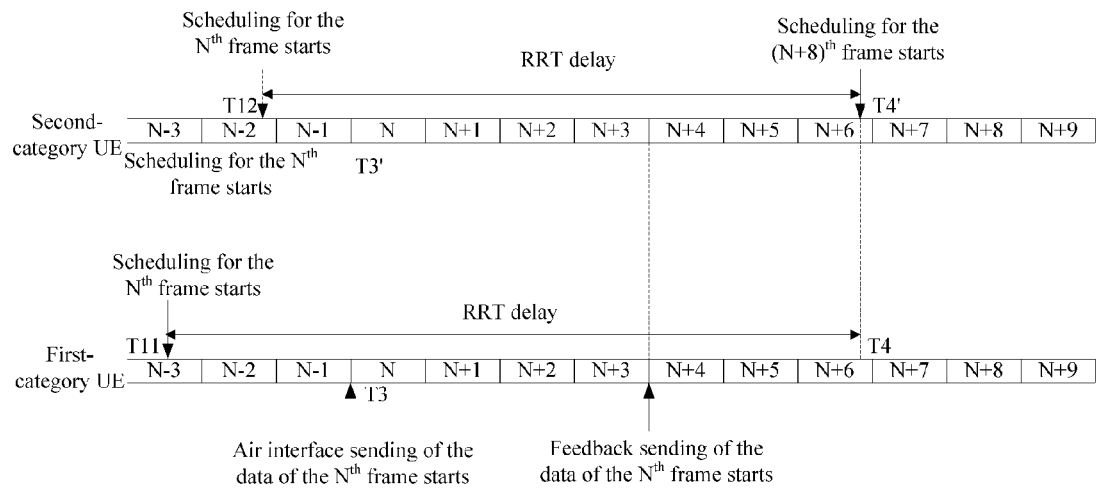
FIG. 6 is a scheduling sequence diagram in the fourth embodiment of the present invention.

For example, continue to refer to FIG. 6, which is a scheduling sequence diagram of the fourth embodiment of the present invention. As shown in FIG. 4, for the first-category UE, the first scheduling is enabled at a T11 moment; and for the second-category UE, the second scheduling is enabled at a T12 moment. In addition, if corresponding air interface transmission moments (T3 and T3')

are aligned, the T11 moment is earlier than the T12 moment, the T3 moment is consistent with the T3' moment, and a T4 moment is consistent with a T4' moment, which are equivalent to increasing the entire RTT delay requirement and make it easier to meet the real-time requirement.

Same as the foregoing embodiment, UEs may be differentiated first, and then first scheduling is enabled only for UE whose current cell is a secondary cell in this embodiment. With reference to the accompany drawing, the following describes an implementation manner of a policy on differentiating between UEs.

Figure 7:
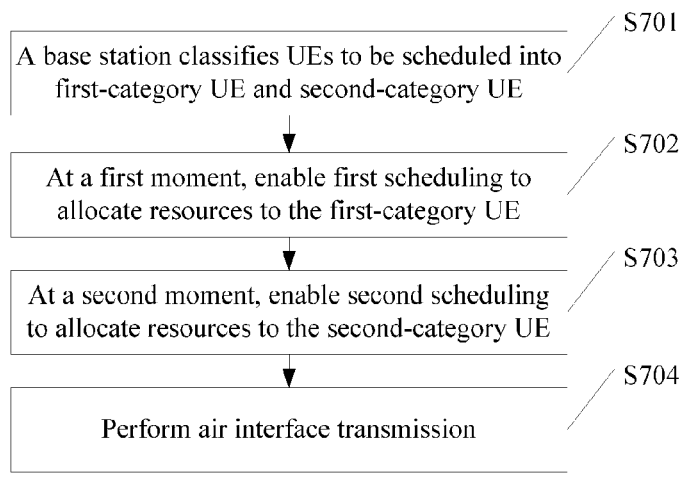
FIG. 7 is a schematic flowchart of a scheduling method according to a fifth embodiment of the present invention.

Refer to FIG. 7, which is a schematic flowchart of a scheduling method according to a fifth embodiment of the present invention. As shown in FIG. 7, the method includes the following steps:

S701: A base station classifies UEs to be scheduled into first-category UE and second-category UE.

The base station is configured to process data on an SCC of the first-category UE, and a current cell of the first-category UE is a secondary cell corresponding to the SCC. UEs served by the base station include the first-category UE and the second-category UE, where the first-category UE is UE supporting CA and whose current cell is a secondary cell, that is, the SCC of the UE is activated and the current cell is a secondary cell corresponding to the activated SCC. The second-category UE is UE that does not conform to the conditions, such as UE that does not support carrier aggregation (CA) (such as UE of R8, R9, or an earlier version), UE supporting CA and whose current cell is a primary cell, and UE supporting CA and whose SCC is not activated.

S702: At a first moment, enable first scheduling to allocate resources to the first-category UE.

S703: At a second moment, enable second scheduling to allocate resources to the second-category UE.

The first moment is ahead of the second moment, for example, at least one frame, 1 ms, or one TTI ahead.

S704: Perform air interface transmission, including: transmitting data of the first-category UE and data of the second-category UE over an air interface according to the resources allocated in steps S702 and S703.

Same as the foregoing embodiment, the constructed scheduling condition may also be used to determine whether to enable first scheduling for UE whose current cell is a secondary cell in this embodiment. That is, steps S401 and S402 are added before step S501, and when a condition of the in-advance scheduling meets any one of the foregoing, steps S501 to S502 shown in FIG. 5 are performed.

With reference to the accompanying drawing, the following describes an implementation manner of a policy on enabling an in-advance scheduling determination condition.

Figure 8:
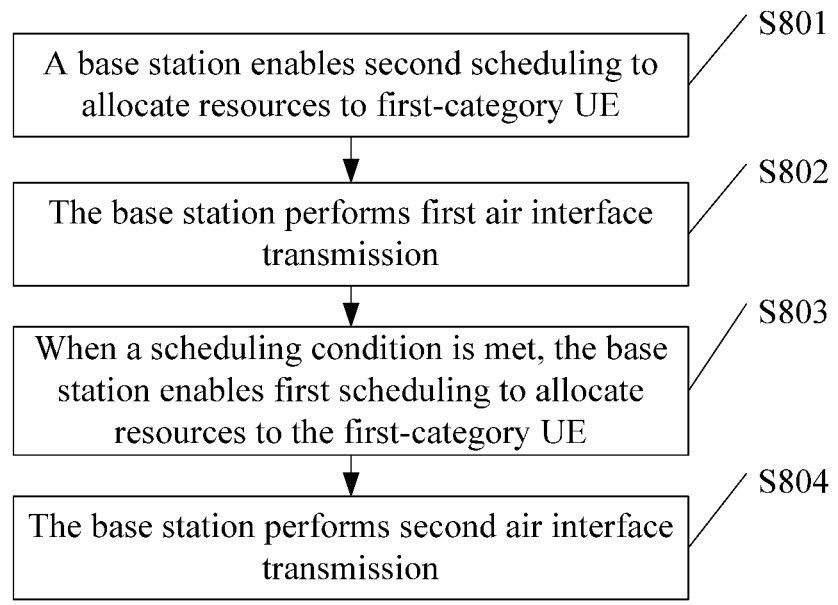
FIG. 8 is a schematic flowchart of a scheduling method according to a sixth embodiment of the present invention.

Refer to FIG. 8, which is a schematic flowchart of a scheduling method according to a sixth embodiment of the present invention. As shown in FIG. 8, the method includes the following steps:

S801: A base station enables second scheduling to allocate resources to first-category UE, where the base station is configured to process data on an SCC of the first-category UE, and a current cell of the first-category UE is a secondary cell corresponding to the SCC.

S802: The base station performs first air interface transmission, including: transmitting data of the first-category UE over an air interface according to the resources allocated to the first-category UE in the second scheduling.

S803: When a scheduling condition is met, the base station enables first scheduling to allocate resources to the first-category UE.

S804: The base station performs second air interface transmission, including: transmitting the data of the first-category UE over the air interface according to the resources allocated to the first-category UE in the first scheduling.

An enabling moment of the first scheduling is a first duration ahead of a first air interface transmission moment, an enabling moment of the second scheduling is a second duration ahead of a second air interface transmission moment, and the first duration is at least one frame, 1 ms, or one TTI greater than the second duration.

It should be noted that content and a setting of the scheduling condition are the same as those in the foregoing embodiment, and therefore no further details are provided herein.

UE is scheduled in advance in the foregoing each embodiment compared with the prior art. An in-advance scheduling volume may be counted on a basis of a duration, such as 1 ms, or may be counted on a basis of a frame, such as one frame. Certainly, in addition to scheduling one frame or 1 ms in advance, scheduling may also be performed two frames (2 ms), three frames (3 ms), or even more in advance according to an actual need, which is not limited in this embodiment. In an actual operation, the number of in-advance frames (or duration) may be selected evenly according to a requirement of air interface performance and a delay requirement. For example, in most cases, a use requirement can be met by scheduling UE one or two frames in advance, and the air interface performance degrades less.

Correspondingly, in the first embodiment, the T2 moment is at least 1 ms or at least one frame earlier than the T1 moment, that is, the duration between the second scheduling and the first scheduling is greater than or equal to nine TTIs. In the second embodiment, on the premise that the T3 moment and the T3' moment are aligned, the T11 moment is at least 1 ms or at least one frame earlier than the T12 moment, that is, the first duration ahead of the air interface transmission moment corresponding to the first scheduling compared with the enabling moment of the first scheduling is at least 1 ms greater than the second duration ahead of the air interface transmission moment corresponding to the second scheduling compared with the enabling moment of the second scheduling.

In addition, the scheduling process is a process of allocating resources to UE, such as allocating air interface resources; and when the allocation is completed, a scheduling result, that is, TBS information, is transmitted to RLC or PDCP to serve as reference during framing of the RLC or the PDCP. Downlink resource allocation includes allocation of Physical Downlink Shared Channel (PDSCH) resources and allocation of Physical Downlink Control Channel (PDCCH) resources. In addition, power allocation and the like are included. During the allocation of the PDSCH and the PDCCH, only the number of resources may be allocated, or both the number and locations may be allocated.

In addition, in a situation in which the total amount of data (such as Q) keeps unchanged, a requirement on inter-board bandwidth (represented by a ratio of Q to an RTT delay requirement) is lowered because of an increase in the RTT delay, so that it is also easier to meet the requirement on the inter-board bandwidth. The following describes a specific implementation of the foregoing solution and an implementation effect by using an example in which a PCC and an SCC are distributed on different boards. However, the present application does not limit that the PCC and the SCC are arranged on different boards. They may also be arranged on a same board; and in this case, the foregoing technical solution may also be used to solve a problem of an inter-board real-time requirement.

Figure 9:
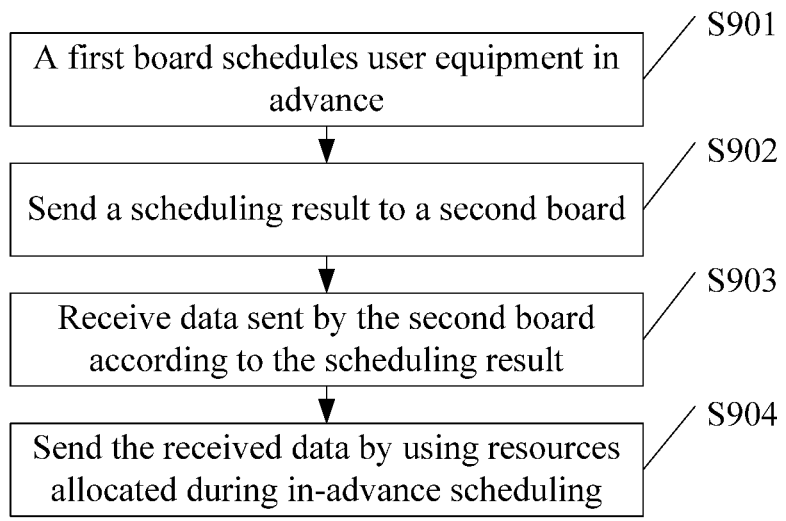
FIG. 9 is a schematic flowchart of a scheduling method according to a seventh embodiment of the present invention.

Refer to FIG. 9, which is a schematic flowchart of a scheduling method according to a seventh embodiment of the present invention. In this embodiment, the method includes the following steps:

S901. A first board schedules user equipment (UE) in advance.

The first board here is a board on which an SCC is located and is configured to process data on an SCC of the UE, and a current cell of the UE is a secondary cell (SCell) corresponding to the secondary component carrier.

S902. Send a scheduling result to a second board.

It should be noted that the scheduling result is a bearing volume on a logical channel and specifically may be a transmission block size (TBS).

The second board here is a board on which a PCC is located and is configured to process data on a PCC of the UE.

S903. Receive data sent by the second board according to the scheduling result.

S904. Send the received data by using resources allocated during in-advance scheduling.

It should be noted that the first board may schedule the UE one frame in advance or perform scheduling two, three, or more frames in advance according to an actual need, which is not limited in this embodiment. In an actual operation, the number of in-advance frames may be selected evenly according to a requirement of air interface performance and a delay requirement. For example, in most cases, a use requirement can be met by scheduling UE one or two frames in advance, and the air interface performance degrades less.

It can be seen that in the foregoing technical solution, a first board on which an SCC is located performs in-advance scheduling for UE and sends a scheduling result to a second board on which a PCC is located so as to instruct the second board to perform RLC PDU framing; and the second board further transmits a framed PDU to the first board, so that the first board sends, by using resources allocated during the in-advance scheduling, data transmitted from the second board. Because of the in-advance scheduling for the UE, a delay requirement on the RLC PDU framing is lowered. In addition, in a situation in which the total amount of data (such as Q) keeps unchanged, a requirement on inter-board bandwidth (represented by a ratio of Q to an RTT delay requirement) is lowered because of an increase in the RTT delay requirement, so that it is also easier to meet the requirement on the inter-board bandwidth.

It should be noted that the first board and the second board in this embodiment may be located in a same subrack or base station, or located in different subracks or base stations; and in a scenario, such as an inter-subrack scenario and a cross-site scenario, that is, when there is a relatively long distance between the first board and the second board, the scheduling method in this embodiment has a better remission effect on a real-time requirement.

In another embodiment, when a PCC and an SCC are distributed on a same board, the foregoing technical solution may also be used. In this case, it only needs to replace the first board and the second board with a first processor and a second processor, where the first processor and the second processor are located on a same board and are configured to process data on a PCC and an SCC of UE, respectively. No further details are provided herein.

It should be noted that a PCC and an SCC are described from an angle of a UE side. For ease of description, this specification borrows this concept, a board processing data borne on a PCC of UE is called a board on which an PCC is located (or a board on which a PCC is deployed), and a board processing data borne on an SCC of the UE is called a board on which an SCC is located (or a board on which an SCC is deployed). In addition, each CC is a PCC for some terminals and may be an SCC for other terminals. Particular UE is not used as an example in the present application, but it is described that a processing manner of scheduling for UE whose current cell is a secondary cell, which is capable of lowering a current delay requirement. However, the UE is not limited in the present application. The UE may also be UE that does not support CA (such as UEs of R8 and R9 versions), UE whose current cell is a PCC, or UE whose SCC is not activated.

The following describes still another implementation manner of the foregoing solution by using an example of a policy on enabling in-advance scheduling through differentiating between UEs.

Figure 10:
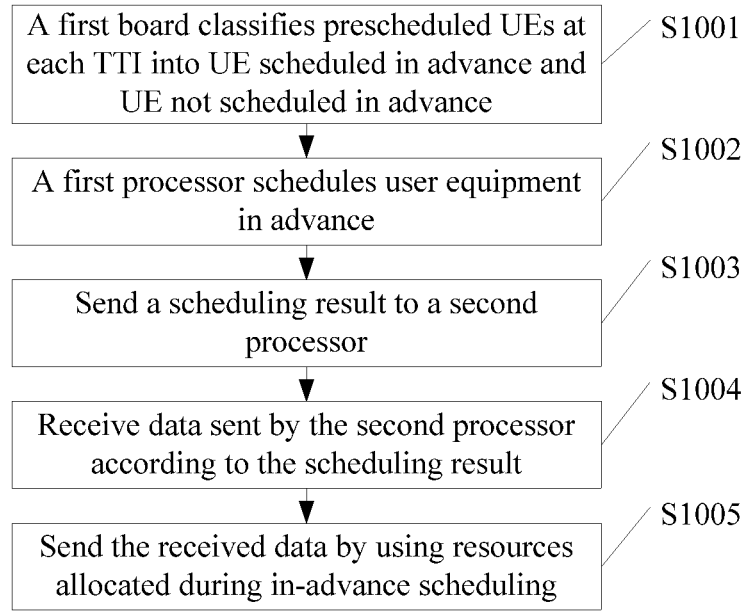
FIG. 10 is a schematic flowchart of a scheduling method according to an eighth embodiment of the present invention.

Refer to FIG. 10, which is a schematic flowchart of a scheduling method according to an eighth embodiment of the present invention. In this embodiment, before step S901, the method further includes the following step:

S1001. A first board classifies UEs to be scheduled at each TTI into UE scheduled in advance and UE not scheduled in advance.

For example, the UE not scheduled in advance includes UE that does not support CA (such as UE of R8 or R9), UE supporting CA and whose SCC is not configured or activated, UE whose current cell is a primary cell (PCell) corresponding to a PCC and for which in-advance scheduling is not performed no matter its SCC is activated or not; and the UE scheduled in advance includes UE whose current cell is an SCell corresponding to an SCC, where, because its current cell is the SCell, it indicates that its SCC is activated, and therefore it may also be called UE whose SCC is activated and whose current cell is the SCell.

In addition, an in-advance scheduling determination function may be deployed on a board. That is, when the problem about a delay requirement, inter-board bandwidth, a hardware processing capability, or the like does not occur, in-advance scheduling may not be enabled; but when the problem occurs, the in-advance scheduling is enabled. In this way, an RTT delay requirement is increased when a scenario is identified, and the in-advance scheduling is not performed in any scenario, so that frequency utilization of an entire network is more greatly improved.

In this case, it is necessary to construct a determining condition for the in-advance scheduling (scheduling condition for short in the following). A round trip delay is a time interval from the time a board on which an SCC is located sends a packet to the time the board on which an SCC is located receives a response to the sent packet, where the response is fed back by a board on which a PCC is located. When this time interval is relatively long, it indicates that a delay itself is fairly long, and it is no good processing data more quickly. In this case, if the in-advance scheduling is performed and the RTT delay requirement is increased, a problem of a decrease in processing efficiency will not be brought, and therefore the in-advance scheduling can be enabled.

In addition, some information reflecting a processing capability of a board itself, such as a load of a board or a base station and periodical statistics about a timeout of air interface data of a board or a base station, may also be used to construct an in-advance scheduling condition. When the information reflects that when the processing capability of the board or a base station in which the board is located is inadequate, it is no good processing data more quickly. In this case, if the in-advance scheduling is performed and the RTT delay requirement is increased, a problem of a decrease in processing efficiency will not be brought, and therefore the in-advance scheduling can be enabled.

For example, when one of the following scenarios is met, in-advance scheduling for UE is enabled:

1) a round trip delay between the first board and a second board is excessively long;

2) there are excessive timeouts of air interface data of the first board or a base station in which the first board is located;

3) a load of the first board or the base station in which the first board is located is excessively heavy; and 4) a load of the second board or a base station in which the second board is located is excessively heavy.

In this case, input of the in-advance determination function may include the following information:

1) the load of the first board or the base station in which the first board is located;

2) the load of the second board or the base station in which the second board is located;

3) periodical statistics about the timeouts of the air interface data of the first board or the base station in which the first board is located; and 4) detection of the round trip delay between the first board and the second board.

In addition, if none of the foregoing in-advance scheduling conditions is met, the in-advance scheduling for the UE may be canceled and normal scheduling is restored, so that the frequency utilization of the entire network is further improved.

For example, when the following scenarios are met, the in-advance scheduling for the UE is canceled:

1) the round trip delay between the first board and the second board is in a required range;

2) the number of timeouts of the air interface data of the first board or the base station in which the first board is located is in a normal range, or a timeout ratio (such as a ratio of timeout data in a period to total data in the period) is in a normal range;

3) the load of the first board or the base station in which the first board is located is in a normal range; and 4) the load of the second board or the base station in which the second board is located is in a normal range.

The following describes still another implementation manner of the foregoing solution by using an example of a policy that whether an in-advance scheduling condition is met is predetermined and in-advance scheduling is enabled when the in-advance scheduling condition is met.

Figure 11:
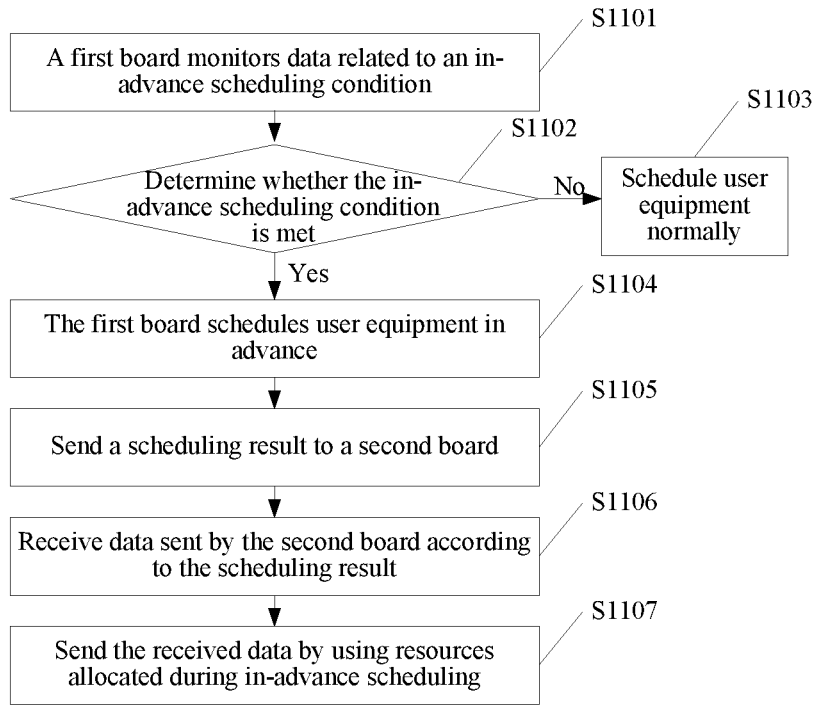
FIG. 11 is a schematic flowchart of a scheduling method according to a ninth embodiment of the present invention.

Refer to FIG. 11, which is a schematic flowchart of a scheduling method according to a ninth embodiment of the present invention. In this embodiment, the method includes the following steps:

S1101. A first board monitors data related to an in-advance scheduling condition.

The related data may be a round trip delay, a timeout situation of air interface data of the first board, a load situation of the first board, a load situation of a second board that is reported by the second board, or the like.

S1102. Determine whether the in-advance scheduling condition is met.

Optionally, the in-advance scheduling condition includes any one of the following:

a round trip delay between the first board and the second board is greater than or equal to a preset value;

a timeout of air interface data of the first board or a base station in which the first board is located reaches or exceeds a preset threshold, where:

certainly, a determining basis of in-advance scheduling may also be a timeout ratio and a percentage of timeout time in the total time;

a load of the first board or the base station in which the first board is located is greater than or equal to a first preset load; and a load of the second board or a base station in which the second board is located is greater than or equal to a second preset load.

Information about the load of the second board may be monitored and sent by the second board to the first board, the base station in which the first board is located may perform statistics about and send the load of the base station in which the first board is located to the first board; the base station in which the second board is located may perform statistics about and send the load of the base station in which the second board is located to the second board, and then the second board sends the load to the first board; and certainly, the base station in which the second board is located may establish an exchange with the first board, so that the base station in which the second board is located directly sends the load to the first board.

When any one of the in-advance scheduling conditions is met, step S1104 is performed; and otherwise, step S1103 is performed.

S1103. Schedule user equipment normally.

When the in-advance scheduling conditions are not met, the in-advance scheduling may not be performed, and the first board may schedule the user equipment at normal time according to the prior art.

S1104. The first board schedules the user equipment in advance.

The first board is configured to process data on a secondary component carrier configured for the user equipment, and a current cell of the user equipment is a secondary cell corresponding to the secondary component carrier.

S1105. Send a scheduling result to the second board.

The second board is configured to process data on a primary component carrier configured for the user equipment.

S1106. Receive data sent by the second board according to the scheduling result.

S1107. Send the received data by using resources allocated during the in-advance scheduling.

In this embodiment, some determining conditions for triggering the in-advance scheduling are provided. Certainly, the in-advance scheduling may be directly performed without being triggering after a determination, and similarly a problem that a real-time requirement is relatively high during CA scheduling processing can be solved.

Figure 12:
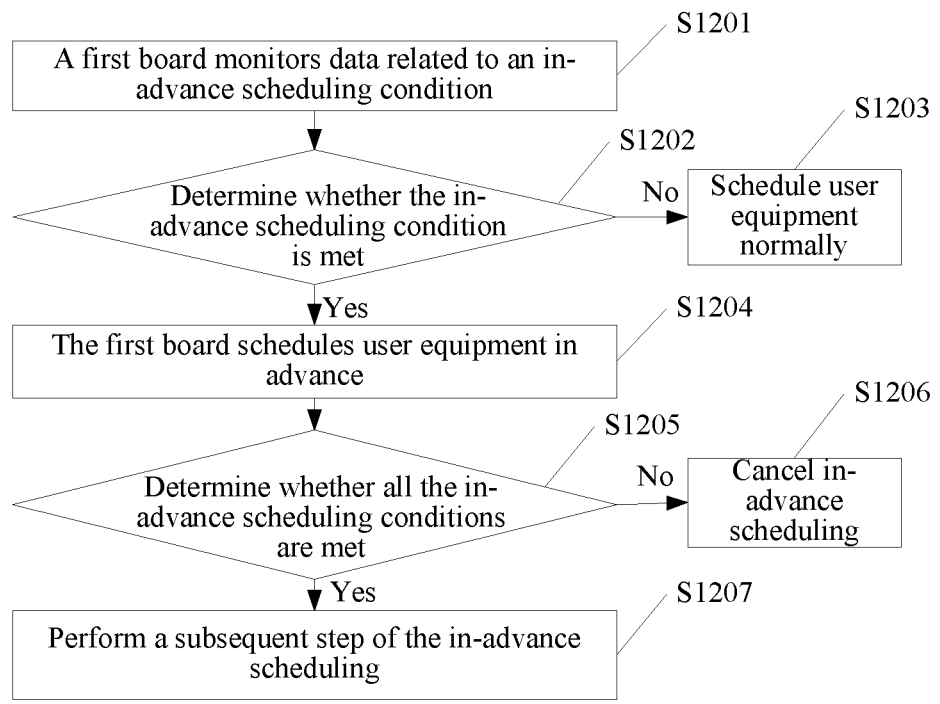
FIG. 12 is a schematic flowchart of a scheduling method according to a tenth embodiment of the present invention.

Refer to FIG. 12, which is a schematic flowchart of a scheduling method according to a tenth embodiment of the present invention. In this embodiment, the method includes the following steps:

S1201. A first board monitors data related to an in-advance scheduling condition.

The related data may be a round trip delay, a timeout situation of air interface data of a board in which the first board is located, a load situation of the first board, a load situation of the second board that is reported by the second board, or the like.

S1202. Determine whether the in-advance scheduling condition is met.

Optionally, the in-advance scheduling condition includes any one of the following:

a round trip delay is greater than or equal to a preset threshold;

the number of timeouts of the air interface data of the board in which the first board is located reaches or exceeds a preset number of times;

a load of the board in which the first board is located is greater than or equal to a first preset load; and a load of the board in which the second board is located is greater than or equal to a second preset load.

When any one of the in-advance scheduling conditions is met, step S1204 is performed; and otherwise, step S1203 is performed.

S1203. Schedule user equipment normally.

S1204. The first board schedules the user equipment in advance.

The board in which the first board is located is configured to process data on a secondary component carrier configured for the user equipment, and a current cell of the user equipment is a secondary cell corresponding to the secondary component carrier.

S1205. Determine whether all the in-advance scheduling conditions are met; if yes, perform step S1207; and otherwise, perform step S1206.

S1206. Cancel in-advance scheduling.

S1207. Perform a subsequent step of the in-advance scheduling, such as sending a scheduling result to the second board, receiving data sent by the second board according to the scheduling result, and sending received data by using resources allocated during the in-advance scheduling.

In this embodiment, a determining condition for canceling the in-advance scheduling is provided; and when none of the in-advance scheduling conditions is met, it indicates that it is unnecessary to perform the in-advance scheduling, and therefore the in-advance scheduling in step S1204 may be canceled. The determination for canceling the in-advance scheduling herein may be performed at any stage of the in-advance scheduling subsequently performed in step S1204. The in-advance scheduling may be performed according to a round trip delay, a board load, and a real-time condition of a timeout of air interface data, so as to ensure optimum resource utilization.

In the foregoing embodiment, the in-advance scheduling refers to allocating resources to UE, and after allocation is completed, a scheduling result, that is, TBS information, is transmitted to the second board to serve as reference for framing of the second board. Downlink resource allocation includes allocation of Physical Downlink Shared Channel (PDSCH) resources and allocation of Physical Downlink Control Channel (PDCCH) resources. In addition, power allocation and the like are included. During the allocation of the PDSCH and the PDCCH, only the number of resources may be allocated, or both the number and locations may be allocated.

For example, during the allocation of the PDSCH, the following may be included: the number of resource blocks (RB) reserved for the user equipment in advance; or the number of RBs and locations reserved for the user equipment in advance. For example, in the $(n-a)^{th}$ frame, the PDSCH resources, that is, the number of RBs, are reserved for the user equipment in advance, and when the $n^{th}$ frame arrives, locations of the RBs are allocated first to the user equipment in advance according to the number of the reserved RBs, and then the number and locations of remaining RBs are allocated to user equipment that is normally scheduled; or, in the $(n-a)^{th}$ frame, the PDSCH resources, that is, the number and locations of RBs, are reserved for the user equipment in advance, and when the $n^{th}$ frame arrives, the number and the locations of the RBs are allocated first to the user equipment in advance according to the number and the locations of the reserved RBs, and then the number and locations of remaining RBs are allocated to user equipment that is normally scheduled, where "a" is the number of frames of the in-advance scheduling.

For example, during the allocation of the PDCCH, the following may be included: reserving the number of Control Channel Elements (CCE) for the user equipment in advance; or reserving the number and locations of the CCEs for the user equipment in advance.

A specific reserving process is similar to the process of the PDSCH, and therefore no further details are provided herein.

Figure 13:
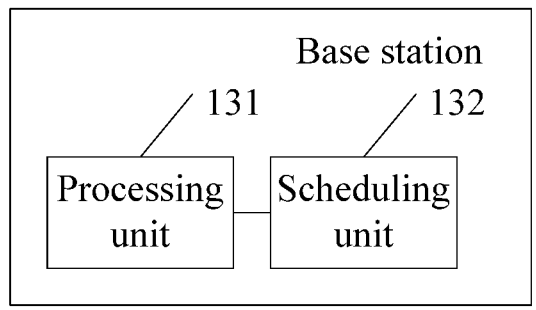
FIG. 13 is a schematic structural diagram of a base station according to an eleventh embodiment of the present invention.

Refer to FIG. 13, which is a schematic structural diagram of a base station according to an eleventh embodiment of the present invention. This embodiment is corresponding to the first embodiment (the embodiment shown in FIG. 1) and is used to implement the method in the first embodiment. As shown in FIG. 13, the base station includes a processing unit 131 and a scheduling unit 132, where the scheduling unit 132 is configured to perform first scheduling and second scheduling for UE, and separately allocate resources for data in the $N^{th}$ frame of the UE and allocate resources for data in the $(N+8)^{th}$ frame of the UE, and a duration between the first scheduling and the second scheduling is greater than eight TTIs; and the processing unit 131 is configured to process data on an SCC of the UE, and a current cell of the UE is a secondary cell corresponding to the SCC, where N is an integer greater than or equal to zero.

Same as the second embodiment (the embodiment shown in FIG. 3), the processing unit 131 is further configured to differentiate first-category UE from second-category UE, so as to trigger the scheduling unit 132 to perform the first scheduling and the second scheduling for the first-category UE.

Figure 14:
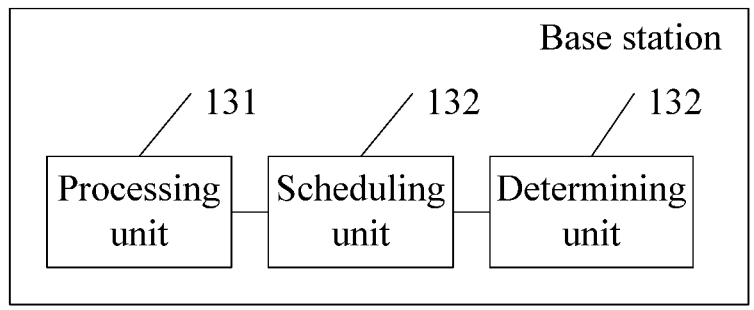
FIG. 14 is a schematic structural diagram of another base station according to the eleventh embodiment of the present invention.

Same as the third embodiment (the embodiment shown in FIG. 4), as shown in FIG. 14, the base station may further include:

a determining unit 133, configured to acquire data related to a scheduling condition, determine whether the scheduling condition is met, and when the scheduling condition is met, trigger the scheduling unit 132 to perform scheduling.

Figure 15:
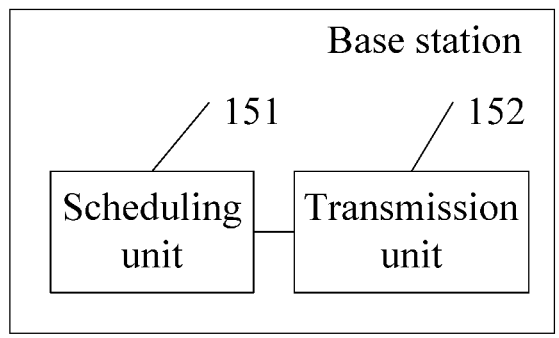
FIG. 15 is a schematic structural diagram of a base station according to a twelfth embodiment of the present invention.

Refer to FIG. 15, which is a schematic structural diagram of a base station according to a twelfth embodiment of the present invention. This embodiment is corresponding to the fourth embodiment (the embodiment shown in FIG. 5) and is used to implement the method in the fourth embodiment. As shown in FIG. 15, the base station is configured to process data on a secondary component carrier of the first-category UE, and a current cell of the first-category UE is a secondary cell corresponding to the secondary component carrier. The base station includes a scheduling unit 151 and a transmission unit 152, where the scheduling unit 151 is configured to enable first scheduling to allocate resources to the first-category UE; and the transmission unit 152 is configured to transmit data of the first-category UE over an air interface according to the resources allocated to the first-category UE, where an enabling moment of the first scheduling is a first duration ahead of an air interface transmission moment corresponding to the first scheduling, the first duration is greater than a second duration, the second duration is a duration ahead of an air interface transmission moment corresponding to the second scheduling compared with an enabling moment of the second scheduling, and the second scheduling is scheduling for the first-category UE when the first scheduling is not enabled;

or, the second scheduling is scheduling for second-category UE, where the second-category UE is any one or more types of UEs among UEs served by the base station: UE that does not support CA, UE supporting CA and whose current cell is a primary serving cell, and UE supporting CA and whose SCC is not activated.

Same as the foregoing embodiment, the first duration is at least one frame, one transmission time interval TTI, or 1 ms greater than the second duration.

Figure 16:
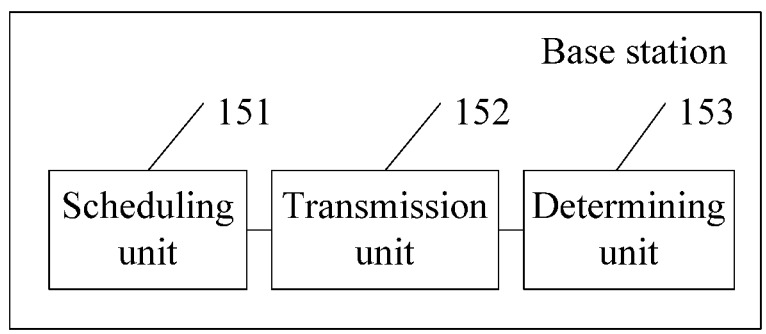
FIG. 16 is a schematic structural diagram of another base station according to the twelfth embodiment of the present invention.

Same as the third embodiment (the embodiment shown in FIG. 4), as shown in FIG. 16, the base station may further include: a determining unit 153, configured to determine whether a scheduling condition is met; and the scheduling unit 151 is configured to enable the first scheduling when the determining unit 153 determines that the scheduling condition is met.

Optionally, when the determining unit 153 determines, after the scheduling unit 151 enables the first scheduling, that the scheduling condition is not met, the scheduling unit 151 is triggered to cancel the first scheduling.

Optionally, the scheduling 151 is further configured to enable, after the first scheduling is enabled, the second scheduling to allocate resources to the second-category UE, and the second scheduling is scheduling for the second-category UE; and the transmission unit 152 is further configured to transmit, when the data of the first-category UE is being transmitted, data of the second-category UE over the air interface according to the resources allocated to the second-category UE.

Description about the scheduling condition is the same as that in the foregoing embodiment, and therefore no further details are provided herein. In addition, a board or a base station may further be provided in this embodiment of the present invention to implement the methods in the seventh embodiment to the tenth embodiment, specifically including units that implement the steps; and therefore no further details are provided herein.

It should be noted that the scheduling unit may be independently arranged in a form of hardware and be independent of a processor of the base station, and may be arranged as a microprocessor; or may be embedded into the processor of the base station in the form of hardware or stored in a memory of the base station in a form of software, so that the processor of the base station invokes and performs an operation corresponding to the scheduling unit.

For example, in the eleventh embodiment (the embodiment shown in FIG. 13), the processing unit 131 may be a processor of the base station or a processor (such as an FPGA chip) on a board on which an SCC corresponding to the UE is located; and a function of the scheduling unit 132 may be embedded in the processor. In addition, same as the scheduling unit 132, the determining unit shown in FIG. 14 may be independently arranged and be independent of the processor; embedded in the processor; or stored in the memory in the form of software, so that the processor invokes and implements its function.

For another example, in the twelfth embodiment (the embodiment shown in FIG. 15), an implementation manner of the scheduling unit 151 is the same as that of the scheduling unit 132, and may be embedded in the processor on the board on which an SCC corresponding to the UE is located, be independently arranged, or stored in the memory in the form of software, so that the processor invokes and implements its function. In addition, same as the scheduling unit 151, the determining unit 153 shown in FIG. 16 may be independently arranged and be independent of the processor; embedded in the processor; or stored in the memory in the form of software, so that the processor invokes and implements its function.

In addition, the transmission unit 152, an interface circuit of the base station, such as an air interface circuit, may be integrated with the scheduling unit 151 or the determining unit 153, or may be arranged independently. This is not limited in this embodiment of the present invention. The processor may be a central processing unit (CPU), a microprocessor, a single-chip microcomputer, or the like.

Figure 17:
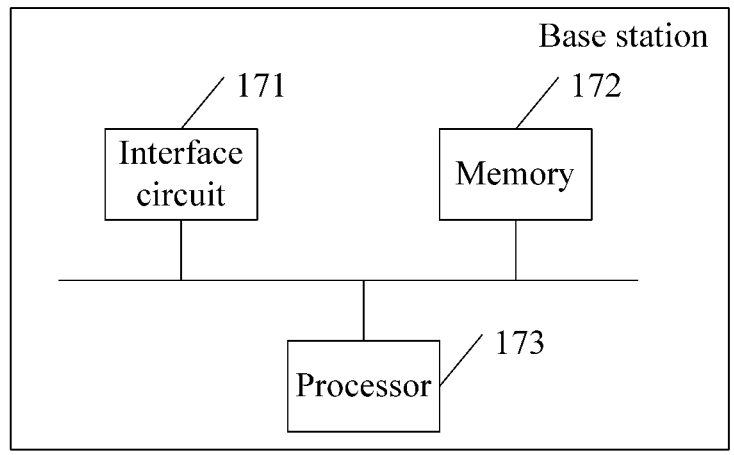
FIG. 17 is a schematic structural diagram of a base station according to a thirteenth embodiment of the present invention.

Refer to FIG. 17, which is a schematic structural diagram of a base station according to a thirteenth embodiment of the present invention. In this embodiment, the apparatus includes:

an interface circuit 171, a memory 172, and a processor 173 that is connected to the interface circuit 171 and the memory 172, where the memory 172 is configured to store a group of program code, and the processor 173 is configured to invoke the program code stored in the memory 172 to perform the operations in the first to the tenth embodiments of the scheduling method in the present invention.

Figure 18:
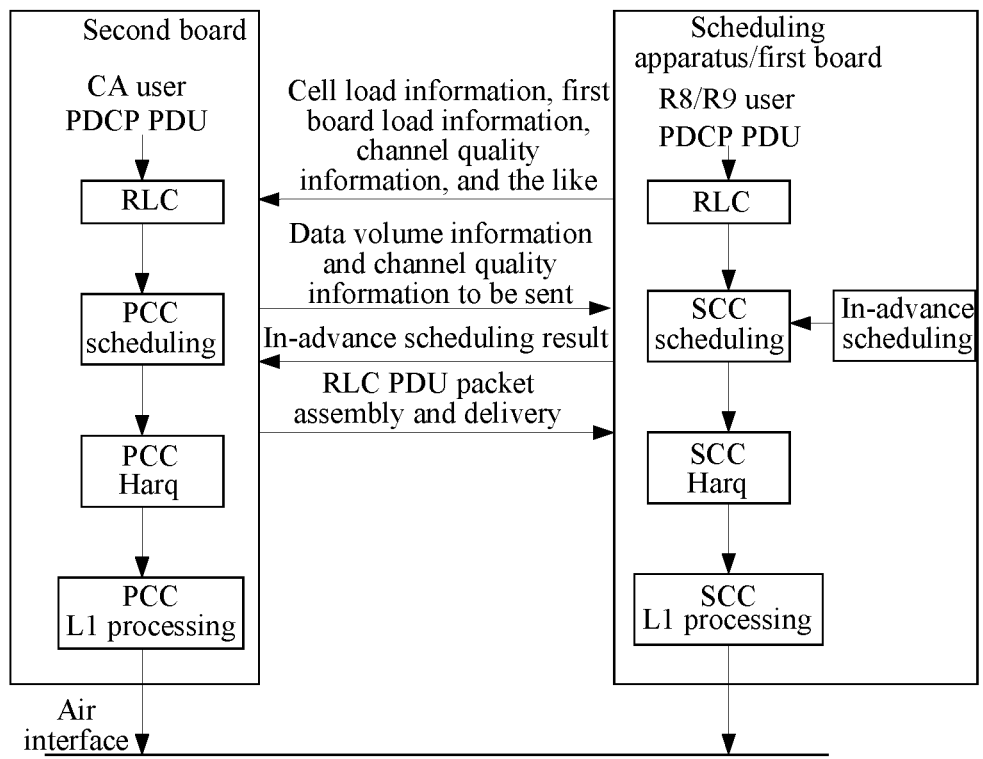
FIG. 18 is a schematic information exchange diagram of a communications system according to the present invention.

Refer to FIG. 18, which is a schematic information exchange diagram of a communications system according to the present invention. In this embodiment, the system includes:

a first board, configured to process data on a secondary component carrier of user equipment; and a second board, configured to process data on a primary component carrier of the user equipment, where the first board includes a processor, configured to perform operations corresponding to the scheduling method in any one of the first to the tenth embodiments.

Physical deployment of inter-board and inter-subrack CA is supported, as shown in FIG. 18. For brevity, it is assumed that the first board does not support a PCC, a secondary component carrier SCC is deployed on the first board, and a primary component carrier PCC is deployed on the second board. Certainly, the first board and the second board may be located in one base station or may not be located in one base station, and multiple boards similar to the first board may further be arranged according to the number of SCCs.

First, the first board sends cell load information, load information of the first board itself, and a CA user's channel quality information on the SCC to the second board according to normal exchange, and the second board allocates received downlink data to different carriers according to the received information in combination with load information of the second board itself. Data volume information, channel quality information, and the like that are to be sent are first sent to the first board, facilitating scheduling performed by the first board. The first board directly performs in-advance scheduling or first determines whether to perform the in-advance scheduling and then performs the in-advance scheduling, and sends an in-advance scheduling result to the second board; at the same time, the second board performs PCC scheduling, and assembles and distributes packets for an RLC PDU of the CA user according to a PCC scheduling result and an in-advance SCC scheduling result; and the first board and the second board separately perform subsequent processing, such as hybrid automatic repeat request processing and processing related to layer 1 (L1), for their respective received data and output the data to an air interface for sending.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

The foregoing detailed descriptions are about a scheduling method and apparatus provided in the embodiments of the present invention. Specific cases are used for describing principles and implementation manners of the present invention. The foregoing descriptions about the embodiments are merely for understanding the methods and core ideas of the present invention. Meanwhile, a person skilled in the art may make modifications to the specific implementation manners and application scopes according to the idea of the present invention. In conclusion, the content of this specification should not be construed as a limitation to the present invention.

What is claimed is:

1. A scheduling method, comprising:
   enabling, by a base station, first scheduling to allocate resources to a first-category user equipment (UE), wherein the base station is configured to process data on a secondary component carrier of the first-category UE, and wherein a current cell of the first-category UE is a secondary cell corresponding to the secondary component carrier; and
   transmitting, by the base station, data of the first-category UE over an air interface according to the resources allocated to the first-category UE;
   wherein an enabling moment of the first scheduling is a first duration ahead of an air interface transmission moment corresponding to the first scheduling; the first duration is greater than a second duration;
   wherein the second duration is a duration ahead of an air interface transmission moment corresponding to second scheduling compared with an enabling moment of the second scheduling;
   wherein the second scheduling is scheduling for one of the first-category UE when the first scheduling is not enabled, or for a second-category UE; and
   wherein the second-category UE is one or more a UE that does not support carrier aggregation (CA), a UE supporting CA and whose current cell is a primary serving cell, and a UE supporting CA and whose secondary component carrier is not activated.

2. The method according to claim 1, wherein the first duration is at least 1 ms greater than the second duration.

3. The method according to claim 1, wherein the method further comprises performing, before the enabling the first scheduling determining whether a scheduling condition is met; and
   wherein the enabling, by a base station, first scheduling comprises enabling the first scheduling when the scheduling condition is met.

4. The method according to claim 3, wherein the scheduling condition comprises one or more of:
   a round trip delay between a board on which a secondary component carrier of the UE is located and a board on which a primary component carrier of the UE is located is greater than or equal to a preset value;
   a timeout of air interface data of a base station or the board on which the secondary component carrier of the UE is located reaches or exceeds a preset threshold;
   a load of the base station or the board on which the secondary component carrier of the UE is located is greater than or equal to a first preset load; and
   a load of a base station or the board on which the primary component carrier of the UE is located is greater than or equal to a second preset load.

5. The method according to claim 3, wherein the method further comprises performing, after the enabling the first scheduling:
   determining whether the scheduling condition is met; and
   canceling in-advance scheduling when the scheduling condition is not met.

6. The method according to claim 1, wherein the method further comprises performing, after the enabling the first scheduling:
   enabling, by the base station, the second scheduling to allocate resources to the second-category UE, wherein the second scheduling is scheduling for the second-category UE; and
   transmitting, by the base station when transmitting the data of the first-category UE, data of the second-category UE over the air interface according to the resources allocated to the second-category UE.

7. A base station, configured to process data on a secondary component carrier of a first-category user equipment (UE), the base station comprising:
   a scheduling unit, configured to enable first scheduling to allocate resources to the first-category UE; and
   a transmission unit, configured to transmit data of the first-category UE over an air interface according to the resources allocated to the first-category UE;
   wherein a current cell of the first-category UE is a secondary cell corresponding to the secondary component carrier;
   wherein an enabling moment of the first scheduling is a first duration ahead of an air interface transmission moment corresponding to the first scheduling;
   wherein the first duration is greater than a second duration;
   wherein the second duration is a duration ahead of an air interface transmission moment corresponding to second scheduling compared with an enabling moment of the second scheduling;
   wherein the second scheduling is scheduling for one of the first-category UE when the first scheduling is not enabled, or for a second-category UE; and
   wherein the second-category UE is one or more of a UE that does not support carrier aggregation (CA), a UE supporting CA and whose current cell is a primary serving cell, and a UE supporting CA and whose secondary component carrier is not activated.

8. The base station according to claim 7, wherein the first duration is at least one frame, one transmission time interval TTI, or 1 ms greater than the second duration.

9. The base station according to claim 7, further comprising:
   a determining unit, configured to determine whether a scheduling condition is met;
   wherein the scheduling unit is configured to enable the first scheduling when the determining unit determines that the scheduling condition is met.

10. The base station according to claim 9, wherein the scheduling condition comprises one or more of:
    a round trip delay between a board on which a secondary component carrier of the UE is located and a board on which a primary component carrier of the UE is located is greater than or equal to a preset value;
    a timeout of air interface data of a base station or the board on which the secondary component carrier of the UE is located reaches or exceeds a preset threshold;

a load of the base station or the board on which the secondary component carrier of the UE is located is greater than or equal to a first preset load; and a load of a base station or the board on which the primary component carrier of the UE is located is greater than or equal to a second preset load.

11. The base station according to claim 9, wherein when the determining unit determines, after the scheduling unit enables the first scheduling, that the scheduling condition is not met, the scheduling unit is triggered to cancel the first scheduling.

12. The base station according to claim 7, wherein the scheduling unit is further configured to enable, after the first scheduling is enabled, the second scheduling to allocate resources to the second-category UE, and the second scheduling is scheduling for the second-category UE; and wherein the transmission unit is further configured to transmit, when transmitting the data of the first-category UE, data of the second-category UE over the air interface according to the resources allocated to the second-category UE.

13. A base station, comprising:

a processor;

a non-transitory computer readable medium connected to the processor ad having stored thereon instructions that, when executed by the processor, cause the base station to:

enable first scheduling to allocate resources to a first-category user equipment (UE); and transmit data of the first-category UE over an air interface according to the resources allocated to the first-category UE;

wherein the base station is configured to process data on a secondary component carrier of the first-category UE;

wherein a current cell of the first-category UE is a secondary cell corresponding to the secondary component carrier;

wherein an enabling moment of the first scheduling is a first duration ahead of an air interface transmission moment corresponding to the first scheduling; the first duration is greater than a second duration;

wherein the second duration is a duration ahead of an air interface transmission moment corresponding to second scheduling compared with an enabling moment of the second scheduling;

wherein the second scheduling is scheduling for one of the first-category UE when the first scheduling is not enabled, or a second-category UE; and wherein the second-category UE is one or more of a UE that does not support carrier aggregation (CA), a UE supporting CA and whose current cell is a primary serving cell, and a UE supporting CA and whose secondary component carrier is not activated.

* * * * *